(12) United States Patent
Harris

(10) Patent No.: US 6,857,579 B2
(45) Date of Patent: Feb. 22, 2005

(54) DISPENSER FOR SCENTS OR AROMAS

(76) Inventor: Rano Harris, P.O. Box 7259, Spanish Fort, AL (US) 36577

( * ) Notice: Subject to any disclaimer, the term of this patent is extended or adjusted under 35 U.S.C. 154(b) by 112 days.

(21) Appl. No.: 10/278,617

(22) Filed: Oct. 23, 2002

(65) Prior Publication Data

US 2004/0083640 A1 May 6, 2004

(51) Int. Cl.⁷ .............................................. A24F 25/00
(52) U.S. Cl. .............................. 239/56; 239/34; 239/53; 239/57; 239/211; 43/1
(58) Field of Search ............................... 239/34, 36, 53, 239/55, 56, 57, 211; 43/1; 132/293, 295, 314, 315; 206/823; 220/500, 520, 531

(56) References Cited

U.S. PATENT DOCUMENTS

| | | | |
|---|---|---|---|
| 3,784,102 A | 1/1974 | Stults | |
| 3,964,684 A | 6/1976 | Schimanski | |
| 4,302,899 A | 12/1981 | DeHart | |
| 4,361,279 A | 11/1982 | Beacham | |
| 4,374,571 A | 2/1983 | Hirvela | |
| D268,695 S | 4/1983 | Kolf | |
| 4,502,630 A * | 3/1985 | Haworth et al. | 239/34 |
| 4,523,717 A | 6/1985 | Schwab | |
| 4,610,394 A * | 9/1986 | Bryson | 239/57 |
| 4,726,584 A | 2/1988 | Bishop | |
| 4,771,563 A | 9/1988 | Easley | |
| 4,773,177 A | 9/1988 | Gray, II et al. | |
| 4,788,787 A | 12/1988 | Konietzki | |
| 4,802,626 A | 2/1989 | Forbes et al. | |
| 4,866,952 A | 9/1989 | Hight et al. | |
| 4,960,240 A * | 10/1990 | McElfresh | 239/56 |
| 4,969,599 A | 11/1990 | Campbell | |
| 5,048,218 A | 9/1991 | Stewart | |
| 5,074,439 A | 12/1991 | Wilcox | |
| 5,094,025 A | 3/1992 | Daniels | |
| 5,161,646 A | 11/1992 | Aurich et al. | |
| 5,220,741 A | 6/1993 | Burgeson | |
| 5,263,274 A | 11/1993 | Speed | |
| 5,282,572 A * | 2/1994 | Fuller | 239/56 |
| 5,299,376 A | 4/1994 | Roberts | |
| 5,303,496 A | 4/1994 | Kowalkowski | |
| 5,307,584 A | 5/1994 | Jarvis | |
| 5,327,667 A | 7/1994 | Fore | |
| 5,348,031 A * | 9/1994 | Cloud | 206/823 |
| 5,456,036 A | 10/1995 | Butz | |
| 5,555,663 A * | 9/1996 | Burgeson | 43/1 |
| 5,611,165 A | 3/1997 | Blaha | |
| 5,622,314 A | 4/1997 | Eason | |
| D382,219 S | 8/1997 | Renfrew | |
| 5,752,658 A * | 5/1998 | Gibbs et al. | 239/56 |
| 5,832,648 A | 11/1998 | Malone | |
| 5,857,281 A | 1/1999 | Bergquist et al. | |
| 5,947,379 A | 9/1999 | Freeman | |
| 5,987,800 A | 11/1999 | Regan | |
| 6,085,989 A | 7/2000 | Cox | |
| 6,101,754 A | 8/2000 | Knapick | |
| 6,102,301 A | 8/2000 | Tiedemann | |
| 6,158,668 A | 12/2000 | Burgeson | |
| D435,896 S | 1/2001 | Burgeson | |

OTHER PUBLICATIONS

Cabela's 2002 Master Catalog pp. 410, 411.

* cited by examiner

*Primary Examiner*—Steven J. Ganey
(74) *Attorney, Agent, or Firm*—David E. Mixon; Bradley Arant Rose & White LLP

(57) ABSTRACT

A dispenser for scents and aromas is disclosed. The dispenser includes at least one pad that is impregnated with a scent material. The pad is fitted in two opposing segments that fit together in a telescoping manner that form an airtight seal to prevent the scent material from evaporating or leaking. The segments are connected by a flexible strap that also serves as a hanger for the dispenser when it is deployed to dispense the scent material.

9 Claims, 19 Drawing Sheets

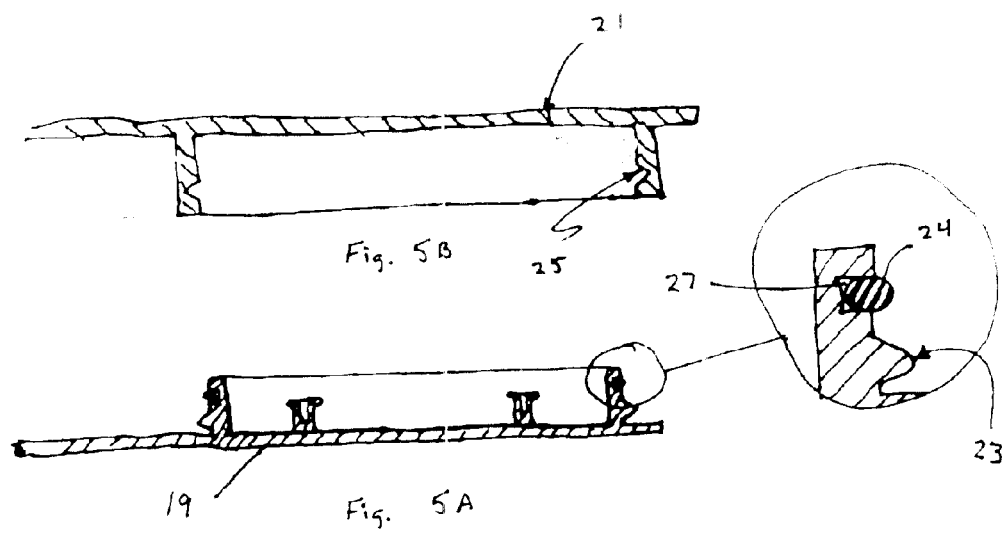
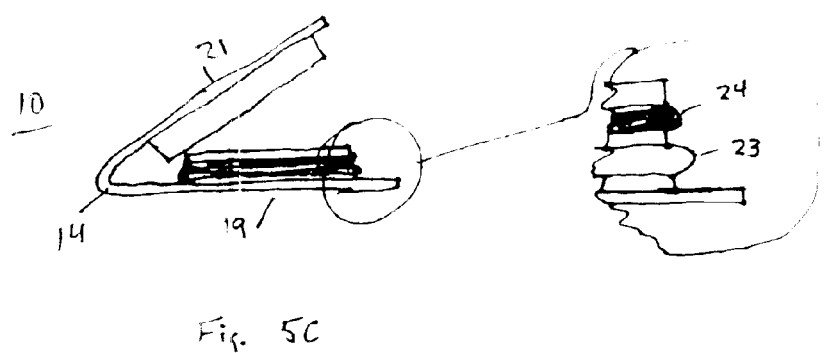

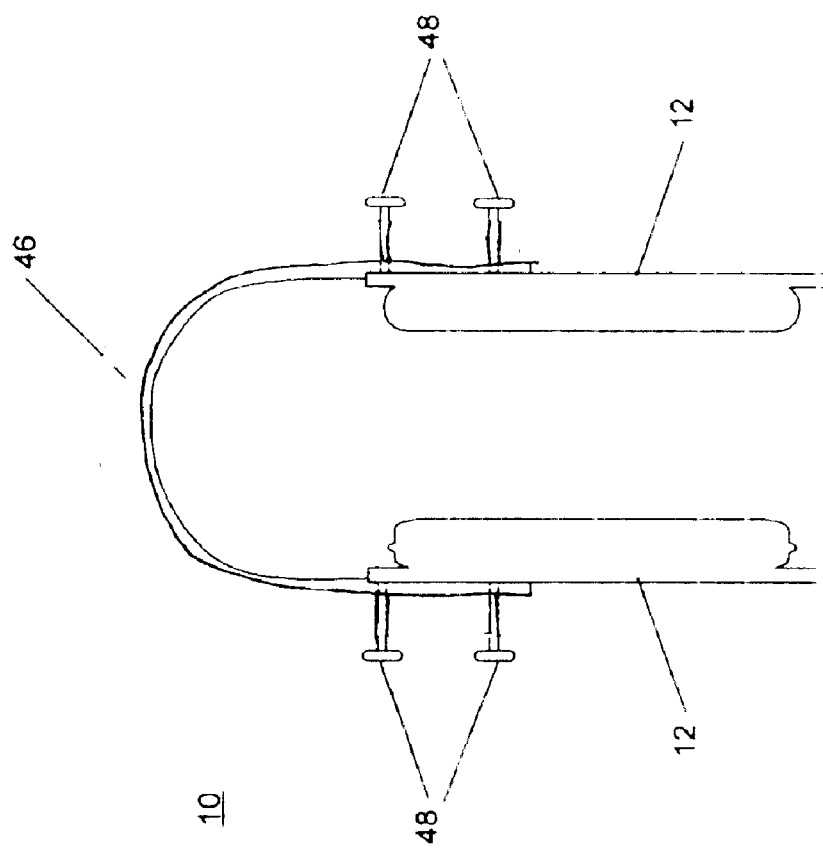

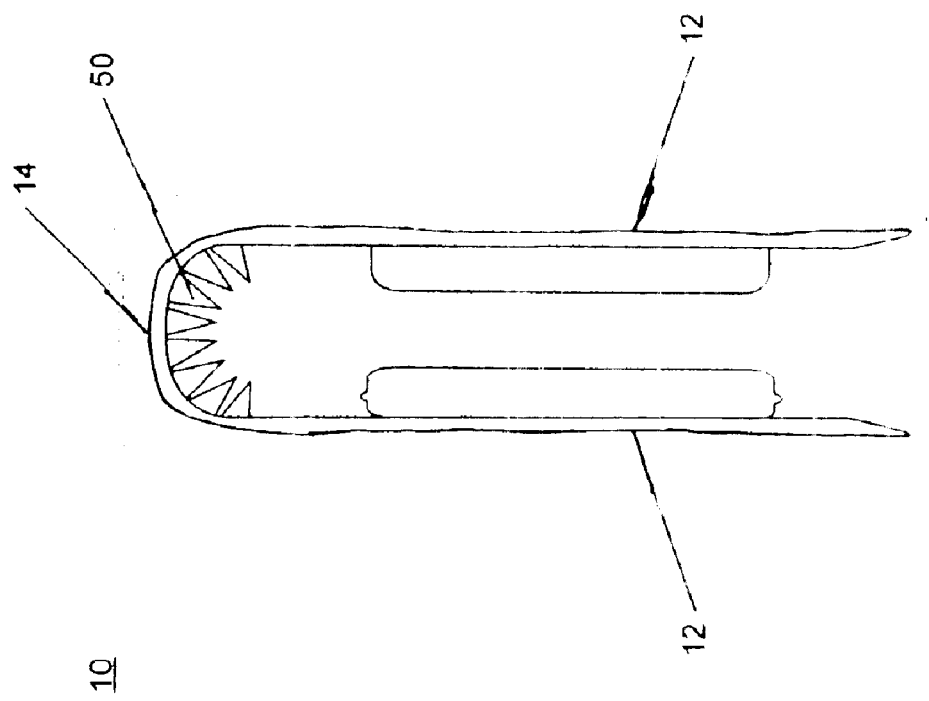

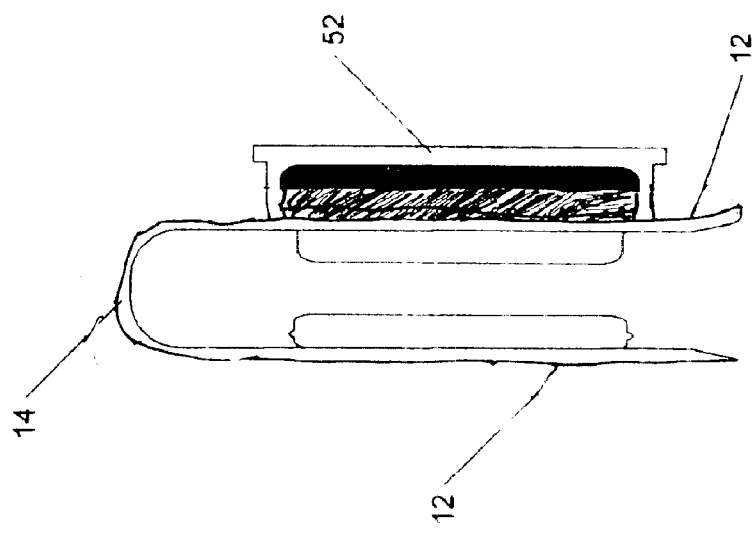

DISPENSER FOR SCENTS OR AROMAS

CROSS-REFERENCE TO RELATED APPLICATIONS

This application claims priority from a U.S. Provisional Patent Application entitled "Dispenser for Scents and Aromas" that was filed on Oct. 23, 2001.

BACKGROUND OF INVENTION

1. Field of the Invention

The invention relates generally to a device for the dispersal of scents, aromas, or fragrances. More specifically, the invention relates to a device for storing and dispensing scents or fragrances by users such as hunters for purposes such as attracting game animals, masking human odors, or repelling pests.

2. Background Art

The use of scents to lure game animals has become a widely-employed technique in hunting, especially in deer hunting, where many different types of liquid scents, as well as some solid and gel-type scent dispensing products are commonly used. In an attempt to lure such a game animal, it is common practice for hunters to utilize several varieties of scents. The most widely-used scents are based upon urine and other animal secretions. Examples include: the regular urine of both doe and buck deer; the urine from a doe deer taken during the estrous period; and the secretions from the tarsal glands of mature buck deer. It is widely believed by hunters that the strategic deployment of such scents in selected locations can help to lure deer to the area.

Alternative scents are designed to cover or mask the human odor of the hunter. Examples of these type scents include: urine of a red fox or a raccoon; and non-urine-based cover or masking scents such as pine or cedar scent, vanilla, or fresh-earth aroma. Alternatively, some hunters employ a variety of prepared materials and extracts that emit food-based scent, such as corn, acorn, persimmon, honeysuckle, apple, and other such food-based scents.

With hunting scents, most hunters use liquid materials. Most often these are packaged in small, glass, screw-cap bottles containing generally 1–4 oz. although some bottles are available with a pump-sprayer mounted on top. Alternatively, scents may be packaged in disposable plastic squeeze-tubes. Scents have also been packaged as solids in deodorant-stick-type dispensers, as gels, in jars, in disposable plastic snap cap vials, and as incense sticks. The most common way to deploy scents involves pouring a few drops of the scent on the ground or on a leaf or branch in the area where the hunter has chosen to hunt. Alternatively, solids or gels may be smeared on a leaf or branch. In the case of the pump-sprayer bottles, the scent is also generally sprayed on a leaf or on the ground.

The hunter usually tries to pick a spot for placement of scents that is visible from his hiding position, whether that position is in a tree-stand or a ground blind, or simply next to a tree or bush on the ground. This enables him to see any deer that is approaching the scent. Generally, the scents are located so that the wind will carry the scent vapors downwind into an area where game may be located. Ideally, the game detect the scent and follow the vapor trail upwind toward the location of the hunter.

The primary disadvantage of these methods of deploying scents are wastage that occurs with pouring or spraying scents and consequently the material is consumed quickly. Additionally, when spraying or pouring the material, it is very difficult to keep the scent from getting onto the hunter's hands or clothes. Often the bottle caps leak, causing the hunter's clothes to reek of the scent. Since the scents are very potent and often extremely foul-smelling, preventing physical contact with the scent is highly desirable.

SUMMARY OF INVENTION

In some aspects, the invention relates to an apparatus for containing a scent, comprising: at least one scent pad that is impregnated with a scent emanating material; two opposing enclosures that fit together in a telescoping manner to form a sealed container, where at least one of the opposing enclosures contains at least one scent pad; and a flexible strap that connects the two opposing enclosures.

In other aspects, the invention relates to an apparatus for containing and deploying a scent, comprising: means for sealably containing the scent; and means for dispersing the scent.

In other aspects, the invention relates to a container for wild game scent attractant comprising: a first segment having an elliptical-shaped male enclosure on an interior side of the first segment and a leaf-shaped pattern on the exterior side of the first segment, where the male enclosure comprises a first sealing wall extending perpendicularly from the interior side of the male enclosure, a circumferential sealing ring along the exterior of the sealing wall, a circumferential seating groove along the exterior of the sealing wall, where the circumferential seating groove is located adjacent to the circumferential sealing ring, and an O-ring seated within the circumferential seating groove; a second segment having an elliptical-shaped female enclosure on an interior side of the second segment and a leaf-shaped pattern on the exterior side of the second segment, where the female enclosure comprises a second sealing wall extending perpendicularly from the interior side of the female enclosure and a circumferential sealing groove along the interior of the sealing wall; a first felt scent pad that is attached to the interior of the male enclosure of the first segment with two posts, where the first felt scent pad is suitable for being impregnated with animal attractant; a second felt scent pad that is attached to the interior of the female enclosure of the second segment with two posts, where the second felt scent pad is suitable for being impregnated with animal attractant; a flexible strap that connects an end of the first segment with an end of the second segment; and where the first segment attaches with the second segment so that the circumferential sealing ring and the O-ring of the male enclosure mates with the circumferential sealing groove of the female enclosure to form an airtight sealed container.

Other aspects and advantages of the invention will be apparent from the following description and the appended claims.

BRIEF DESCRIPTION OF DRAWINGS

It should be noted that identical features in different drawings are shown with the same reference numeral.

FIG. 5A shows a side view of a male segment of an open scent container accordance with one embodiment of the present invention.

FIG. 5B shows a side view of a female segment of an open scent container in accordance with one embodiment of the present invention.

FIG. 5C shows a side view of an open scent container in accordance with one embodiment of the present invention.

FIG. 15 shows a cross-sectional view of a scent container with a detachable strap in accordance with an alternative embodiment of the present invention.

FIG. 16 shows a cross-sectional view of a scent container with serrated teeth on the interior of the strap in accordance with an alternative embodiment of the present invention.

FIG. 17 shows a cross-sectional view of a scent container with an attached heating element in accordance with an alternative embodiment of the present invention.

DETAILED DESCRIPTION

The present invention is directed to a lightweight, compact, sealably closable scent container composed of two segments which each hold an absorbent scent pad. The two segments are connected by an integral, flexible strap member. In addition to keeping the two segments together to comprise an integrated structure, the strap serves to allow opening and closing of the container by allowing the two segments to be pulled apart to expose the absorbent material containing the scent and allowing them to be brought together in mating contact to sealably close the container. When the container is opened, the strap has enough resilience so that the planes of the segments form an angle and meet at an apex on the strap. Additionally, the strap attaches the container on a branch of a tree or other similar structure where the device may be deployed.

Figure 1:
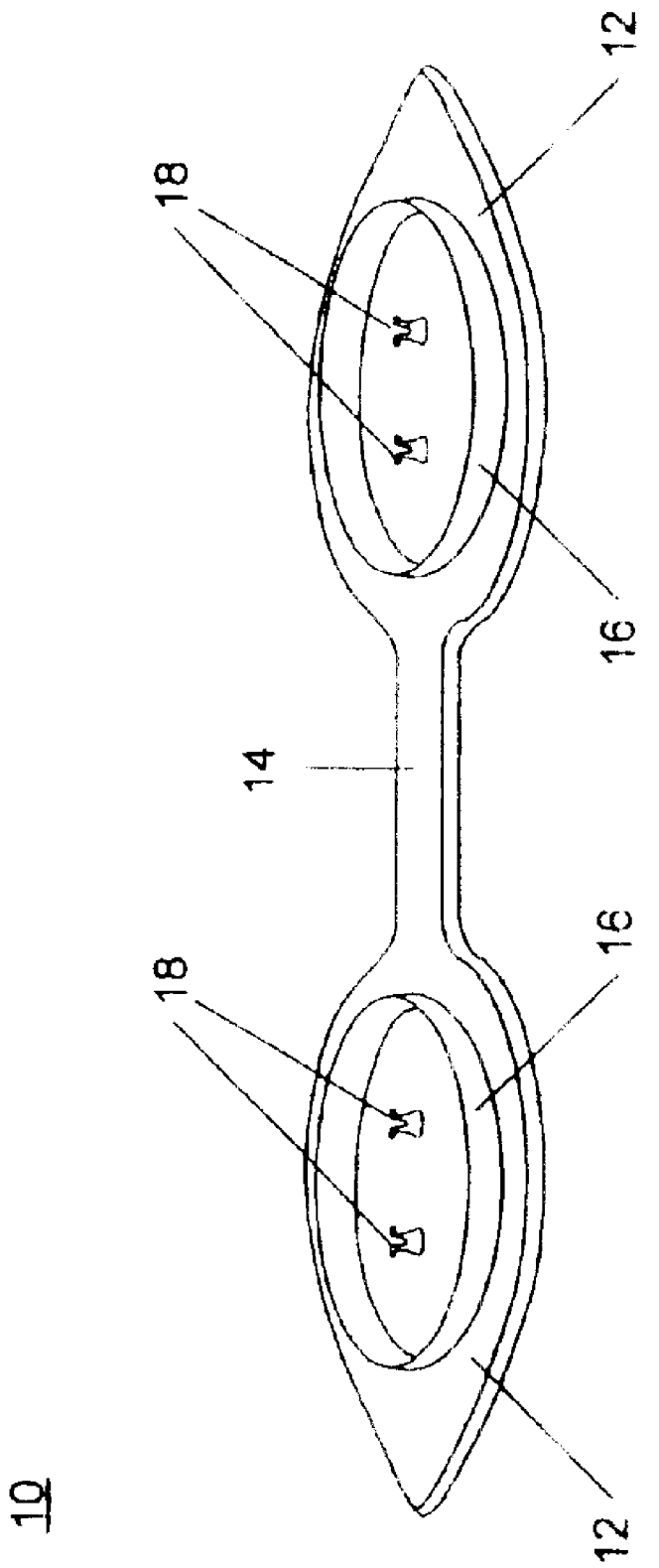
FIG. 1 shows a perspective view of an open scent container in accordance with one embodiment of the present invention.
Figure 2:
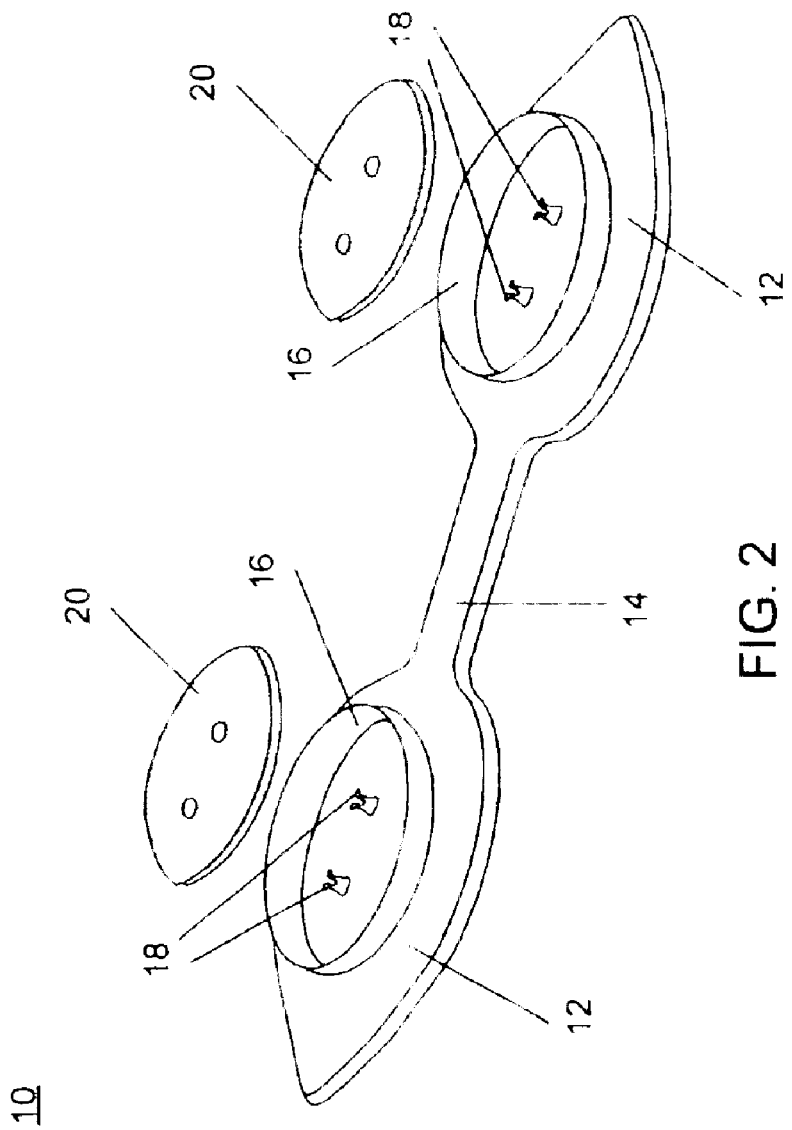
FIG. 2 shows a perspective view of an open scent container and unattached scent pads in accordance with one embodiment of the present invention.
Figure 3:
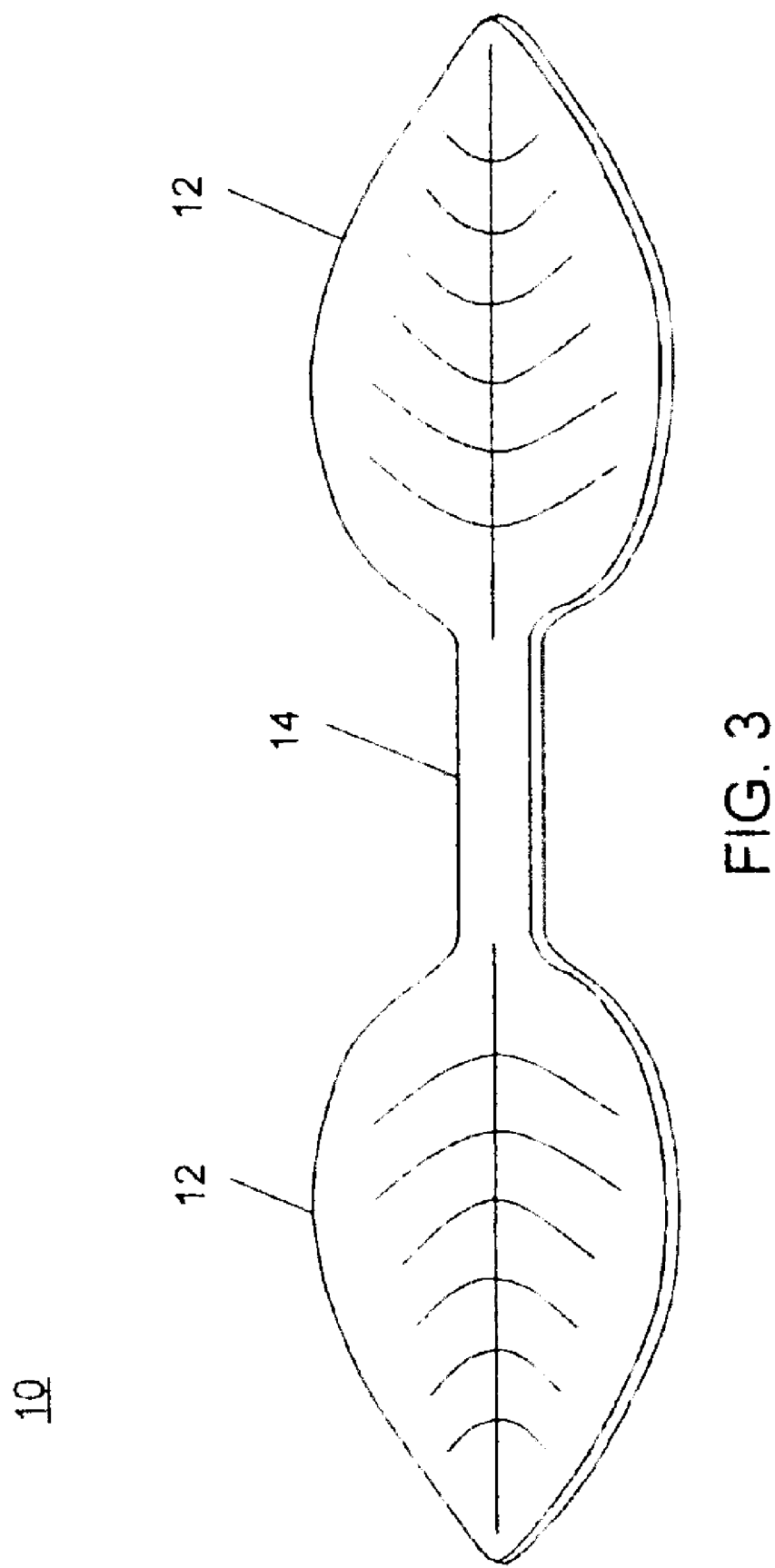
FIG. 3 shows a bottom view of an open scent container in accordance with one embodiment of the present invention.
Figure 4A:
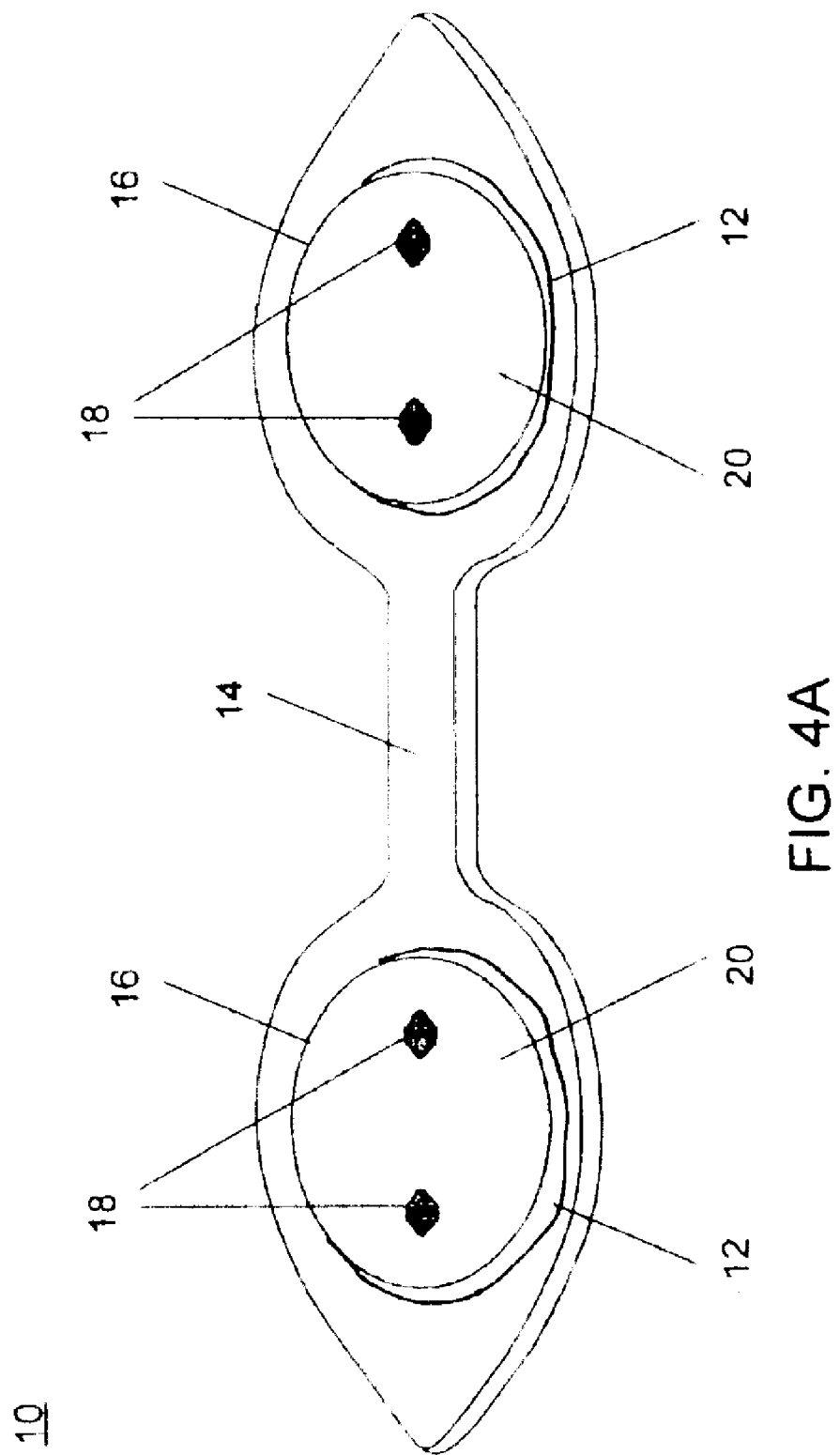
FIG. 4A shows a top view of an open scent container with attached scent pads in accordance with one embodiment of the present invention.
Figure 4B:
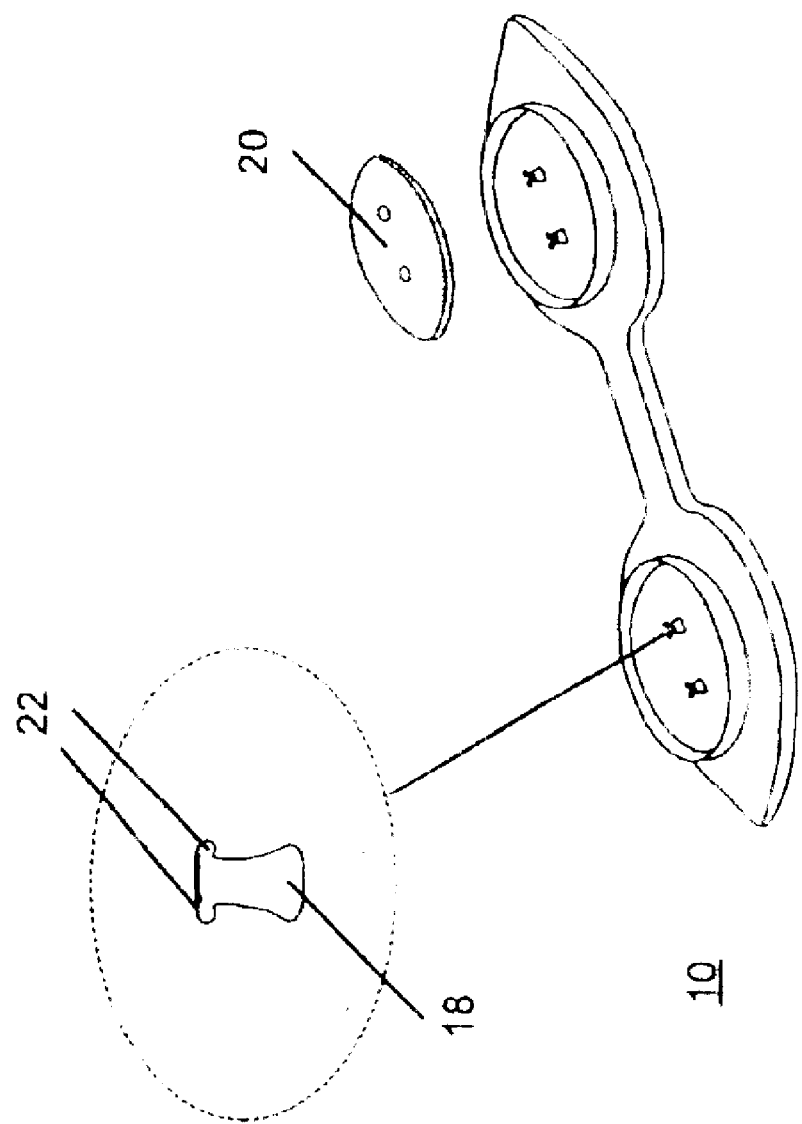
FIG. 4B shows a side view of a post for attaching a scent pad to the scent container in accordance with one embodiment of the present invention.

FIG. 1 shows a perspective view of an open scent container 10 in accordance with one embodiment of the present invention. The container 10 includes two segments 12 that are joined by a connecting strap 14. Each segment 12 contains an oval shaped sealing wall 16 that encloses dual posts 18. As shown in FIG. 2, scent pads 20 are placed within the sealing walls 16 of each segment 12 and are held in place by the posts 18. FIG. 3 shows a bottom view of an open scent container 10. This view shows the exterior of the container 10 when it is closed. The shape and exterior of each segment 12 resembles a leaf for purposes of camouflage when the container is deployed on a tree branch. FIG. 4A shows a top view of an open scent container 10 with scent pads 20 attached. This view shows an open container 10 in with scent pads 20 held in place on each segment 12 by two posts 18. FIG. 4B shows a side view of one post 18. The post 18 has a base that is attached on one end to the container 10. Two opposing hooks 22 extend outward from the base. The scent pad 20 contains two holes that allow the pad 20 to fit over the two posts 18. The hooks 22 of each post engage the pad 20 and hold it in place. The scent pads 20 may also be held in place by a variety of other techniques, such as adhesive materials, annular retaining rings, or simply by a friction or interference fit within the containers. Each of these embodiments allow the scent pad to be replaced periodically when the scent pad wears out or when a new scent is used.

The sealing walls 16 form an elliptical shaped enclosure that holds the scent pad 20. The sealing walls 16 on each segment 12 of the scent container 10 are configured so that the wall of one segment (i.e., the "female" segment) can create a sealed connection by enclosing the wall of the other segment (i.e., the "male" segment). The slightly smaller wall of the male segment fits within the slightly larger wall of the female segment in a telescoping fashion. The walls of the segments are sized so that they "snap" together and stay closed when the connection is made. As shown in FIG. 5A, the male segment 19 has a circumferential sealing rim 23 around the exterior of its wall. An O-ring 24 is fitted into a circumferential groove 27 that is located above the sealing rim 23. The O-ring 24 ensures a proper seal when the container is closed. In FIG. 5B, the female segment 21 has an interior sealing groove 25 that is on the interior of the enclosure. The sealing groove mates with the sealing rim to hold the segments together and along with the O-ring, form a completed seal. The seal prevents any liquid from spilling or evaporating as well as preventing any odor from escaping the closed container. FIG. 5C shows a side view of a container 10 in the open position. The female segment 21 fits over the male segment 19 in a telescoping manner. The planes of the segments 21 and 19 form an angle that intersects at an apex on the strap 14 of the container 10.

Figure 6:
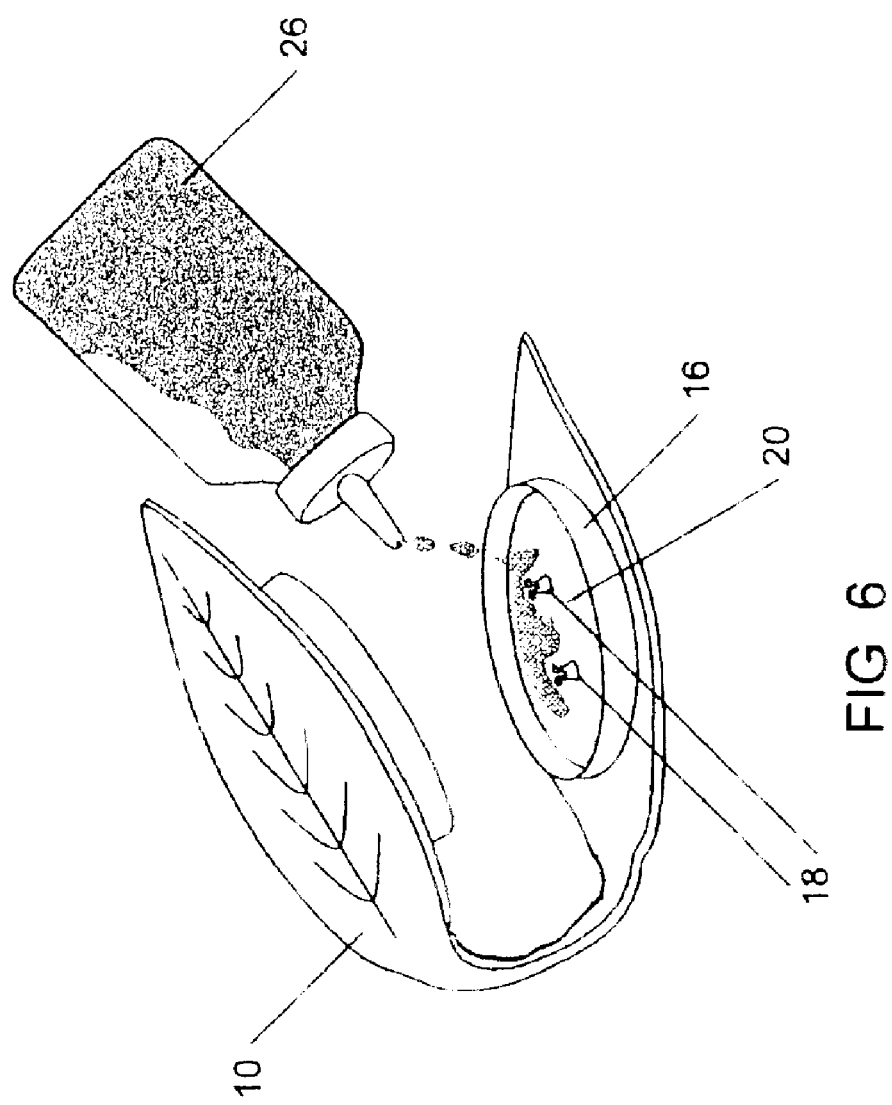
FIG. 6 shows a liquid scent concentrate being added to a scent pad in an open scent container in accordance with one embodiment of the present invention.

FIG. 6 shows an example of a liquid scent concentrate 26 being applied to a scent pad 20 in the container 10. In this embodiment, the scent 26 is applied with a bottle. However, the scent could alternatively be applied with a dropper, a tubular pipetting device, a tube such as a section of a soda straw, or by various other techniques such as spraying or pouring the scent. In alternative embodiments, the container could be purchased by the user in a "ready-to-use" form that is pre-loaded or pre-impregnated with scent by the commercial supplier. The container would be stored in an airtight pouch or other airtight packaging until the user is ready to deploy it.

Figure 7:
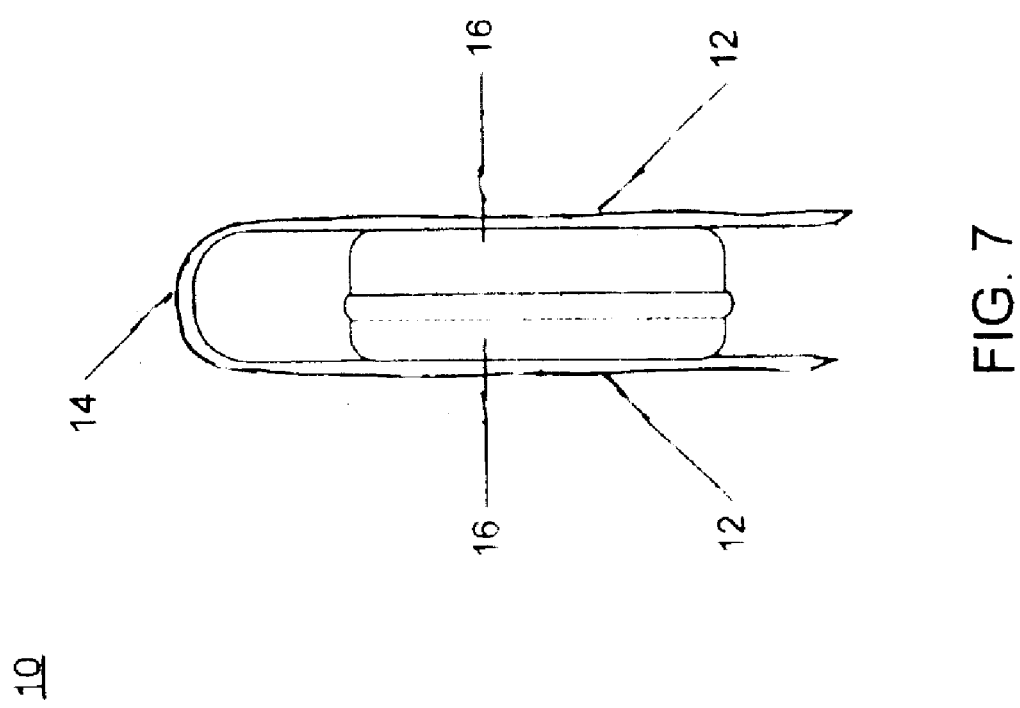
FIG. 7 shows a side view of a closed scent container in accordance with one embodiment of the present invention.
Figure 8:
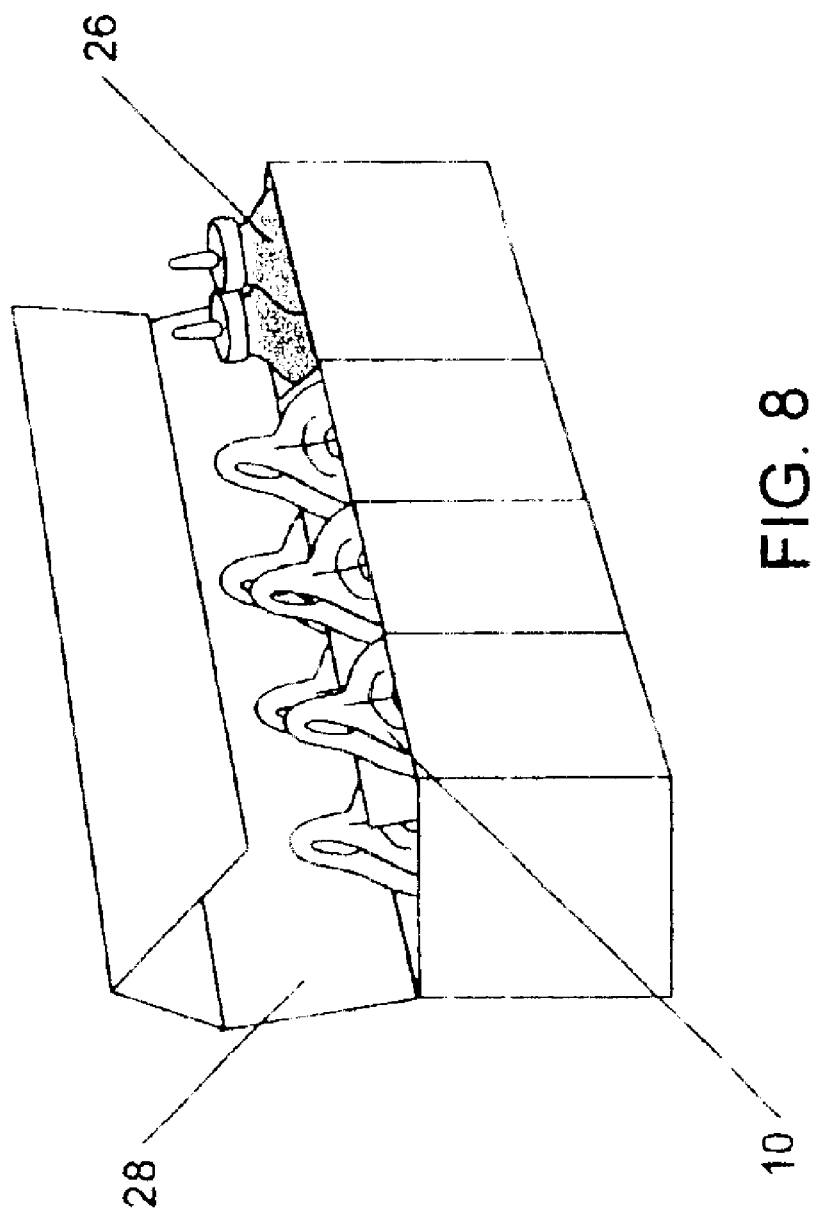
FIG. 8 shows a perspective view of a carry pouch with multiple closed scent containers and bottles of liquid scent concentrate in accordance with one embodiment of the present invention.
Figure 9:
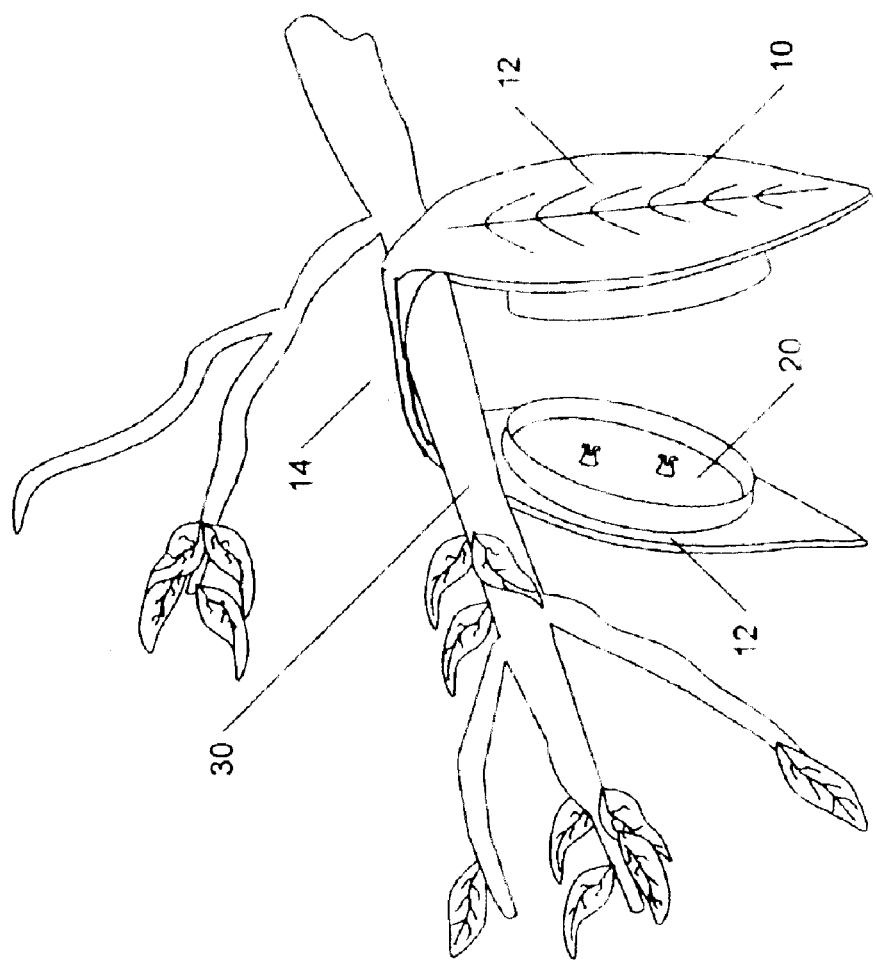
FIG. 9 shows an open scent container deployed on a tree branch in accordance with one embodiment of the present invention.
Figure 10:
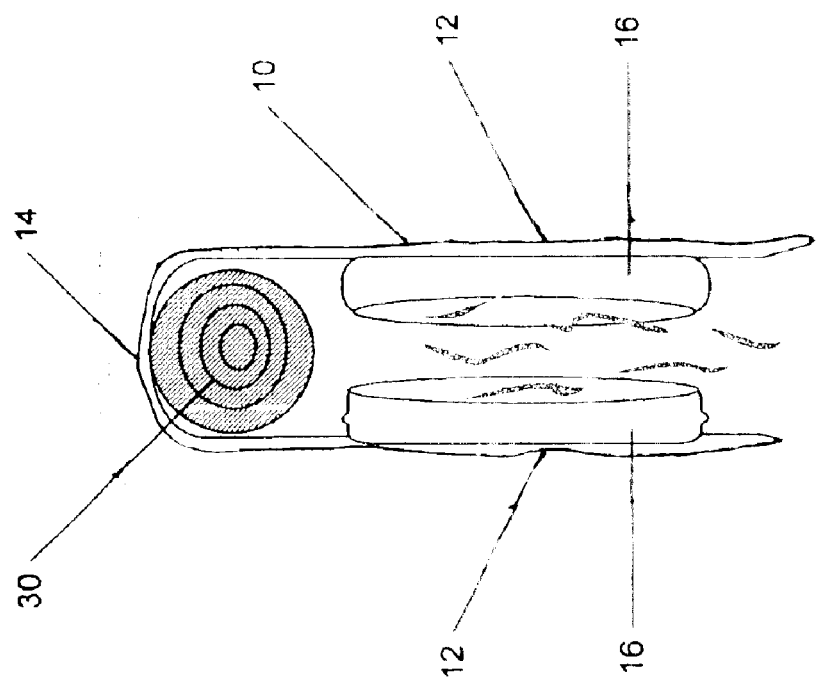
FIG. 10 shows a cross-sectional view of an open scent container deployed on a tree branch in accordance with one embodiment of the present invention.
Figure 11:
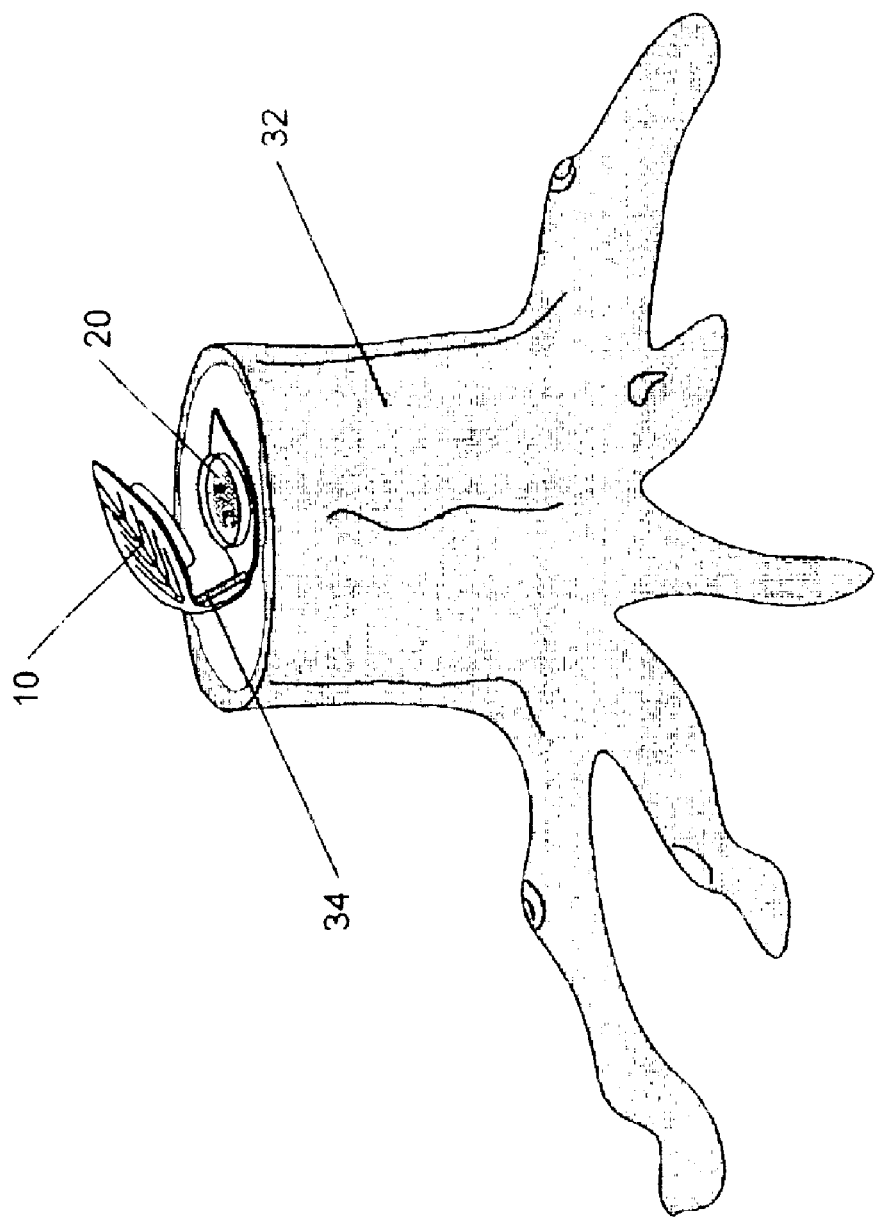
FIG. 11 shows an open scent container deployed on a tree stump in accordance with one embodiment of the present invention.

FIG. 7 shows a side view of a closed scent container 10. When the container is closed, it is compact for easy carrying. FIG. 8 shows a carry pouch 28 with multiple closed scent containers 10 and bottles of liquid scent concentrate 26. The pouch is configured to hold multiple containers and multiple types of scent concentrate. The pouch may be attached to a belt or other similar device. Once at the selected site, the hunter deploys the container 10 as shown in FIG. 9. The two segments 12 are spread apart and the container 10 is placed over a structure such as a tree limb 30. The container 10 is held in place by the connecting strap 14. The segments 12 are draped downward in such a way that the scent pads 20 are exposed to circulating wind currents that cause the scent to begin to evaporate and emanate throughout the area as shown in FIG. 10. Additionally, the container may be deployed on other structures that are suitable to support the connecting strap such as a fence line. This deployment technique shields the scent pads 20 from the elements and helps prevent the scent from being washed away by rain or snow. FIG. 11 shows an alternative technique of deployment. In this embodiment, the container 10 is deployed in the open position by resting on a tree stump 32. Typically, the planes of the two segments form an angle that intersects at an apex located on the strap. While the container is capable of maintaining the open position with just the rigidity of the strap, a prop may be used for additional support in alternative embodiments. In such an embodiment, the container 10 may use a prop 34 to keep the scent pads 20 exposed to the air. Other techniques for deployment may include resting the container only any structure that is capable of providing an adequate horizontal support.

The container itself is typically made of a thermoplastic polymer resin by machining or molding. However, other suitable materials might comprise composite thermoplastic resins, thermosetting polymer resins, thermosetting composite polymer resins, thermoplastic elastomers, and other synthetic and natural elastomeric materials that have suitable characteristics for forming the container. Examples of such materials include: polypropylene; high-density polyethylene; or ethylene vinyl acetate. A suitable material would be a lightweight, inexpensive material which would be suitably inert to the chemical compounds comprising the scents and fragrances to be used with the device. The material should also have an appropriate combination of properties such as: favorable molding characteristics; the ability to be molded in various colors; low relative cost; hardness; flexibility; temperature resistance; weatherability; and durability to permit the strap to flex repeatedly from the open position to the closed position. Additionally, the material should have properties suitable to permit the two container segments to flex sufficiently to permit the segments to "snap" together into the closed position while affording enough rigidity to form an air-tight sealing engagement of the O-ring.

The container may be camouflaged as shown previously in FIG. 3. In this embodiment, the exterior of the segments are shaped to resemble the leaf of a shrub or tree. This configuration permits the device, when deployed and used by a hunter to attract game, to blend into the natural surroundings and avoid frightening the animal. The overlapping outer surfaces can be configured to resemble the leaves of any number of different tree or shrub species, such as oak, hickory, gum or other hardwoods, without affecting the shape of the container segments. Additionally, the outer, leaf-shaped surfaces can be further configured to more closely resemble the natural appearance of foliage by a variety of techniques, such as by engraving or molding simulated leaf veins onto the surfaces. Also, a variety of other decoration techniques may be used such as applying adhesive labels imprinted with graphic images of foliage. Additionally, printing, silk-screening, or otherwise coating or applying a substance to the surfaces in a pattern or design which resembles the surface of a shrub or tree leaf may be used.

The container may be further camouflaged by the use of different colors. Ideally, the container should be made visible to the hunter but still inconspicuous to the game by using containers made in bright, but natural woodland colors such as: red, orange, gold, brown, and green. These and other colors that are commonly found on woodland trees and shrubs during the fall season are acceptable as natural woodland camouflage coloring.

Another consideration in the appearance of the container is retrieval by the hunter. In daylight hours, containers made from brightly colored plastic facilitate their location and retrieval after use. However, retrieval of the container is often done during darkness or low light conditions. In low light conditions, or conditions of darkness, retro-reflective tape strips, dots, or other similar materials may be used to assist in locating the containers with a flashlight. Typically, adhesive strips of reflective tape or other reflective materials are applied to the body of container. Consequently, a flashlight shined in the general direction of such container will be reflected which allows the hunter to find the location of the container.

In an alternative embodiment, the container may be manufactured from a type of resin which exhibits "glow-in-the-dark" characteristics. The resin may glow after having been exposed to light for a period of time. Alternatively, the resin may have been treated or blended with certain components in order to add such properties. A "glow-in-the-dark" container would further facilitate the location of the container by the user without using a flashlight. The use of light-reflective marks on the container's surface, together with "glow-in-the-dark" plastic, would enable the device to be located and recovered very easily in the dark and would lessen the likelihood of the container being lost by the user.

In other embodiments, in may be necessary to know the identity of the material contained in a scent container. The contents of the container may be identified with adhesive labels, tags, or other such marking devices that are applied to the container.

The scent pad may be made of an absorbent material constructed of a natural or synthetic felt material. Alternatively, the material may be made of: an open-celled foam material; a natural or synthetic woven wick material; cotton or other fibrous wadding material; or other comparable materials capable of receiving and holding a quantity of liquid or gelled scent materials. In particular, a felt-type material of a synthetic fiber such as polyester is well-suited for use in the container. Such fibers do not tend to change the odor or aroma of the scent. Furthermore, a synthetic fiber such as polyester also retards the growth of molds and mildew in the closed container.

However, the scent pad material is not limited to absorbent materials. Other scent retaining, scent-containing or scent impregnated materials may be utilized with the container for a variety of scent-dispersal applications. For example, a cloth bag filled with particles of a scented "potpourri" material similar to the type used for dispersing a pleasant fragrance within a home may be used. The scent-storage material is unlimited with respect to the type of materials which may be employed. For example, a "cake" or wafer of an impregnated plastic or waxy substance may be used with a particular scent and utilized within the container. A further example of different type of scent-storage and dispersal medium would be a disc of a natural or synthetic material, such as plastic, that is molded or fabricated with a multitude of tiny openings arranged across its surface. These openings form a type of matrix, such that a liquid scent can be dispensed into the openings and held in place by capillary attraction until evaporation occurs. Likewise, a solid or semi-solid material could be spread and forced into the openings and then be allowed to evaporate overtime.

Figure 12:
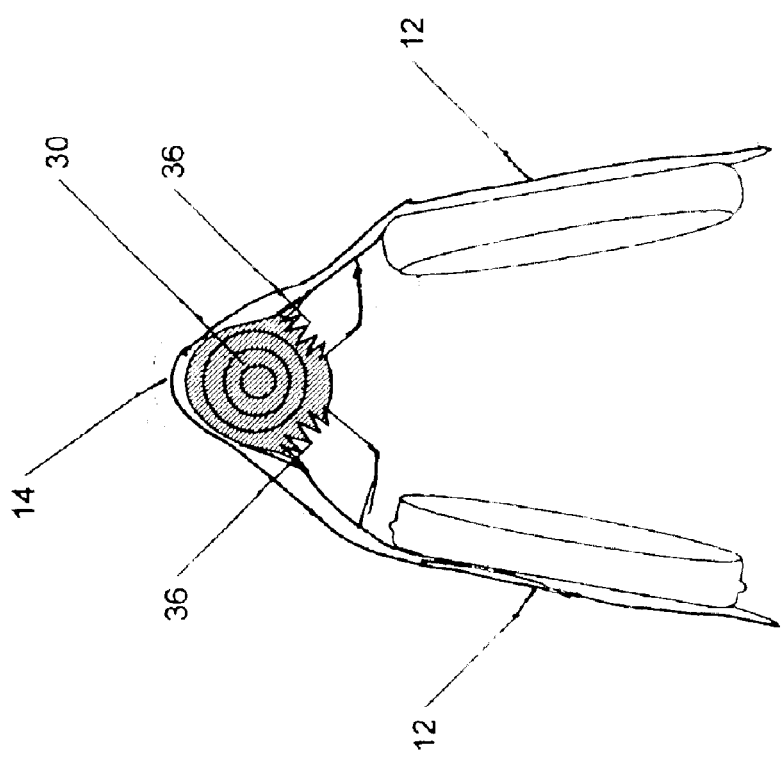
FIG. 12 shows a cross-sectional view of an open scent container deployed on a tree branch in accordance with an alternative embodiment of the present invention.

FIG. 12 shows an alternative embodiment for the connecting strap 14 of the container. In this embodiment, the body of each segment 12 is extended from the sealing walls. This extension forms serrated teeth 36 that help the strap 14 grip the tree limb 30 to hold the container in position. FIG. 16 shows an alternative configuration of this technique with the serrated teeth 50 positioned on the underside of the center of the strap 14.

Figure 13B:
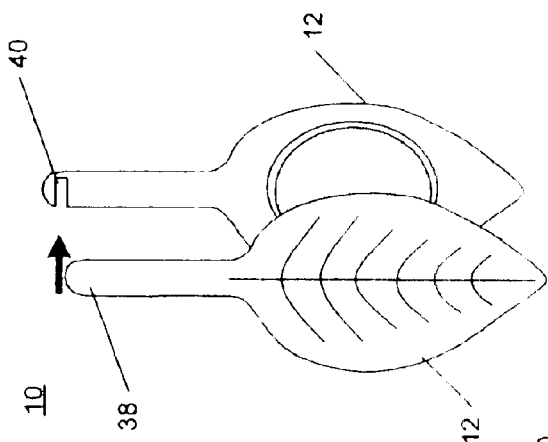
FIG. 13B shows a frontal view of a scent container with a sliding attachment for a strap in accordance with an alternative embodiment of the present invention.
Figure 13C:
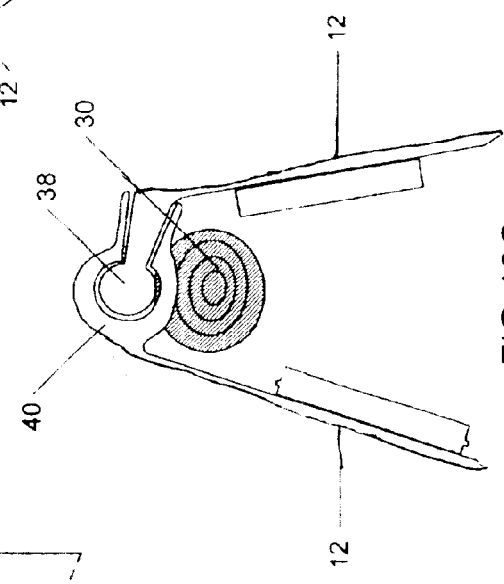
FIG. 13C shows a cross-sectional view of a scent container with a sliding attachment for a strap that is deployed on a tree branch in accordance with an alternative embodiment of the present invention.
Figure 13A:
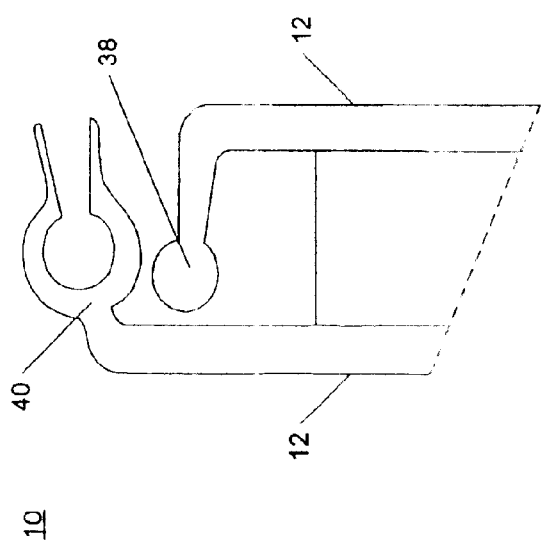
FIG. 13A shows a side view of a scent container with a sliding attachment for a strap in accordance with an alternative embodiment of the present invention.

FIGS. 13A, 13B and 13C show an alternative embodiment of the container 10 with a sliding attachment. As shown in FIG. 13A, when the container 10 is closed, the sliding attachment, which includes a male section 38 and a female section 40, is disconnected. When the container 10 is opened, the male section 38 slides into the female section 40 to form a support to place the container 10 over a tree branch 30.

Figure 14B:
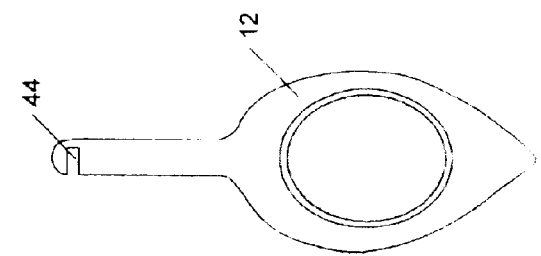
FIG. 14B shows a frontal view of a female segment of a scent container with a snap attachment for a strap in accordance with an alternative embodiment of the present invention.
Figure 14C:
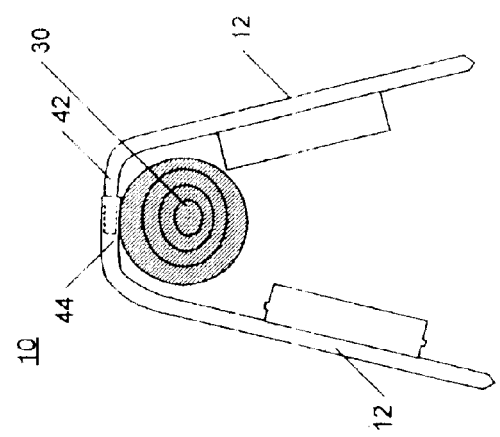
FIG. 14C shows a cross-sectional view of a scent container with a snap attachment for a strap that is deployed on a tree branch in accordance with an alternative embodiment of the present invention.
Figure 14A:
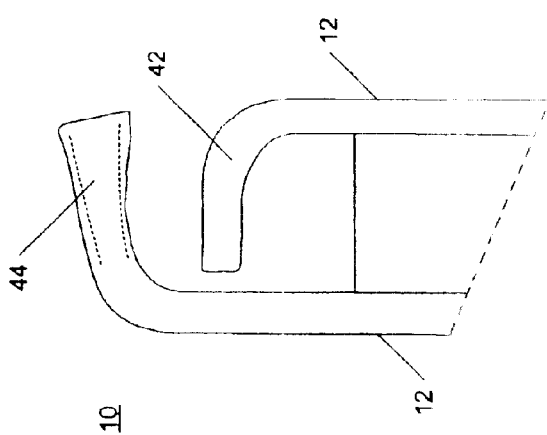
FIG. 14A shows a side view of a scent container with a snap attachment for a strap in accordance with an alternative embodiment of the present invention.
Figure 18B:
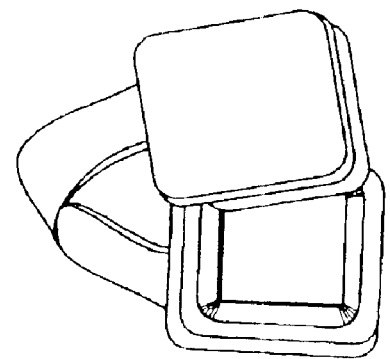
FIGS. 18A–18D each show separate exterior configurations of scent containers in accordance with alternative embodiments of the present invention.
Figure 18D:
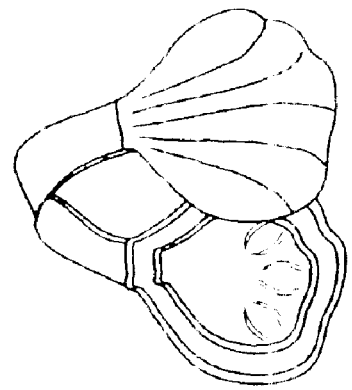
Figure 18A:
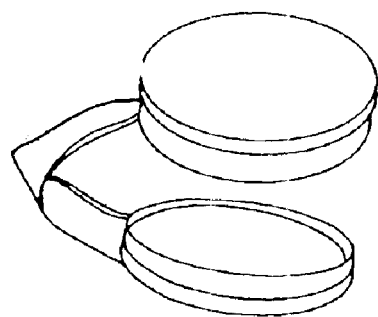
Figure 18C:
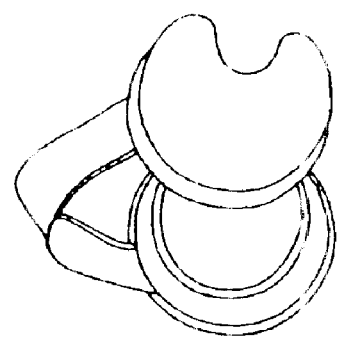

FIGS. 14A, 14B and 14C show an alternative embodiment of the container 10 with a snap-on attachment. As shown in FIG. 14A, when the container 10 is closed, the snap-on attachment, which includes a male section 42 and a female section 44, is disconnected. When the container 10 is opened, the male section 42 is inserted into the female section 44 to form a support to place the container 10 over a tree branch 30.

FIG. 15 shows another alternative embodiment of the container 10. In this embodiment, the connecting strap 14 is detachable at each section. This facilitates easy replacement of a strap 14 if it becomes worn or broken. The strap 14 is connected to the segments 12 by multiple pegs 48. In some embodiments, the pegs 48 are simply removed to replace the strap 14 and re-inserted into the segments to attach the replacement.

FIG. 17 shows another alternative embodiment of the container 10. In this embodiment, a heating element 52 is attached to the exterior of a segment 12. The heating element 52 heats the segment 12 and the scent pad. This heating accelerates the evaporation and dispersal of the scent. The heating element 52 may be heated by an electrical heating mechanism that is powered by a battery or by a chemical heating mechanism.

In other alternative embodiments, the scent container may be used for purposes other than attracting game animals or masking the scent of a hunter. For example, the container may be used to hold a repellent scent to keep pests away from patios, gardens, or yards. Additionally, the container could be used to hold air freshening scents to be used indoors or in automobiles. As with these alternative uses, differing designs for the exterior of the container may be used. FIGS. 18A–D show differing decorative styles that may be used in conjunction with the possible uses of the present invention.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus for containing a scent, comprising:
    at least one scent pad that is impregnated with an animal attractant;
    two opposing enclosures that fit together in a telescoping manner to form a sealed container, where at least one of the opposing enclosures contains at least one scent pad; and
    a flexible strap that connects the two opposing enclosures.

2. The apparatus of claim 1, where the animal is a deer.

3. An apparatus for containing a scent, comprising:
    at least one scent pad that is impregnated with a scent emanating material;
    two opposing enclosures that fit together in a telescoping manner to form a sealed container, where at least one of the opposing enclosures contains at least one scent pad; and
    a flexible strap that connects the two opposing enclosures, where the strap holds the apparatus in place when the apparatus is deployed to disperse the scent.

4. The apparatus of claim 3, where the apparatus is deployed over a tree limb.

5. An apparatus for containing a scent, comprising:
    at least one scent pad that is impregnated with a scent emanating material;
    two opposing enclosures formed in the shape of a leaf that fit together in a telescoping manner to form a sealed container, where at least one of the opposing enclosures contains at least one scent pad; and
    a flexible strap that connects the two opposing enclosures.

6. An apparatus for containing a scent, comprising:
    at least one scent pad that is impregnated with a scent emanating material;
    a male and female opposing enclosures that fit together in a telescoping manner to form a sealed container, where at least one of the opposing enclosures contains at least one scent pad;
    where the male opposing enclosure comprises,
        a circumferential exterior sealing ring; and
        a compressible O ring located adjacent to the circumferential exterior sealing ring; and
    a flexible strap that connects the two opposing enclosures.

7. The apparatus of claim 6, where the female opposing enclosure comprises a circumferential interior sealing groove.

8. The apparatus of claim 7, where the circumferential interior sealing groove of the female opposing enclosure mates with the circumferential exterior sealing ring of the male opposing enclosure to form the sealed container.

9. A container for wild game scent attractant comprising:
- a first segment having an elliptical-shaped male enclosure on an interior side of the first segment and a leaf-shaped pattern on the exterior side of the first segment, where the male enclosure comprises
  - a first sealing wall extending perpendicularly from the interior side of the male enclosure,
  - a circumferential sealing ring along the exterior of the sealing wall,
  - a circumferential seating groove along the exterior of the sealing wall, where the circumferential seating groove is located adjacent to the circumferential sealing ring, and
  - an O-ring seated within the circumferential seating groove;
- a second segment having an elliptical-shaped female enclosure on an interior side of the second segment and a leaf-shaped pattern on the exterior side of the second segment, where the female enclosure comprises
  - a second sealing wall extending perpendicularly from the interior side of the female enclosure and
  - a circumferential sealing groove along the interior of the sealing wall;
- a first felt scent pad that is attached to the interior of the male enclosure of the first segment with two posts, where the first felt scent pad is suitable for being impregnated with animal attractant;
- a second felt scent pad that is attached to the interior of the female enclosure of the second segment with two posts, where the second felt scent pad is suitable for being impregnated with animal attractant;
- a flexible strap that connects an end of the first segment with an end of the second segment; and
- where the first segment attaches with the second segment so that the circumferential sealing ring and the O-ring of the male enclosure mates with the circumferential sealing groove of the female enclosure to form an airtight sealed container.

* * * * *